(12) United States Patent
Zhou et al.

(10) Patent No.: US 9,017,542 B2
(45) Date of Patent: Apr. 28, 2015

(54) PROCESS FOR RECOVERING VALUABLE METALS FROM PRECIOUS METAL SMELTING SLAG

(71) Applicant: Xiangguang Copper Co., Ltd., Liaocheng (CN)

(72) Inventors: Songlin Zhou, Shandong (CN); Xiangtian Xie, Shandong (CN)

(73) Assignee: Xiangguang Copper Co., Ltd., Shandong (CN)

( * ) Notice: Subject to any disclaimer, the term of this patent is extended or adjusted under 35 U.S.C. 154(b) by 331 days.

(21) Appl. No.: 13/711,305

(22) Filed: Dec. 11, 2012

(65) Prior Publication Data
US 2014/0008238 A1    Jan. 9, 2014

(30) Foreign Application Priority Data
Jul. 3, 2012   (CN) .......................... 2012 1 0229667

(51) Int. Cl.
| | | |
|---|---|---|
| *C25C 1/18* | (2006.01) | |
| *C25C 1/20* | (2006.01) | |
| *C22B 30/06* | (2006.01) | |
| *C25C 3/34* | (2006.01) | |
| *C22B 7/04* | (2006.01) | |

(Continued)

(52) U.S. Cl.
CPC ... *C25C 3/34* (2013.01); *C25C 1/18* (2013.01); *C25C 1/20* (2013.01); *C22B 7/04* (2013.01); *C22B 11/023* (2013.01); *C22B 13/025* (2013.01); *C22B 30/06* (2013.01)

(58) Field of Classification Search
USPC .......................................................... 75/418
See application file for complete search history.

(56) References Cited

U.S. PATENT DOCUMENTS

| 1,967,053 A | * | 7/1934 | Fingland et al. ................. 75/418 |
| 2,084,394 A | * | 6/1937 | Heberlein ........................ 75/418 |
| 2,202,893 A | * | 6/1940 | Betterton et al. ............... 75/418 |

(Continued)

FOREIGN PATENT DOCUMENTS

| AU | 2012250290 | 8/2013 |
| CN | 101831551 | 9/2010 |

OTHER PUBLICATIONS

King, Michael, Venkoba Ramachandran, R. David Prengaman, Stephen C. DeVito, and Joseph Breen. "Lead and Lead Alloys." Kirk-Othmer encyclopedia of chemical technology (1996).*

(Continued)

*Primary Examiner* — Harry D Wilkins, III
(74) *Attorney, Agent, or Firm* — Swanson & Bratschun, L.L.C.

(57) ABSTRACT

The present invention provides a process for recovering valuable metals from precious metal smelting slag, comprising: smelting the precious metal smelting slag and a flux in a top-blown rotary furnace to produce a lead-bismuth alloy, wherein the precious metal smelting slag comprises Au, Ag, Bi and Pb; electrolyzing the lead-bismuth alloy at a current density ranging from 60 to 110 A/m2 to obtain lead cathode and lead anode slime; refining the lead anode slime to produce bismuth and silver-zinc crust, and extracting gold and silver separately from the silver-zinc crust. Through utilizing a top-blown rotary furnace as the smelting apparatus and adjusting the ratio of the flux, the present invention enriches the valuable metals gold, silver, bismuth, lead or the like to lead-bismuth alloy, ensures lower contents of gold, silver, bismuth and lead in the reducing slag and thereby increases the comprehensive recovery rates of gold, silver, bismuth and lead from the precious metal smelting slag.

10 Claims, 1 Drawing Sheet

(51) Int. Cl.
*C22B 11/02* (2006.01)
*C22B 13/02* (2006.01)

(56) References Cited

U.S. PATENT DOCUMENTS

| | | | | |
|---|---|---|---|---|
| 3,944,414 | A * | 3/1976 | Yanagida et al. | 75/418 |
| 3,960,681 | A * | 6/1976 | Nomura et al. | 205/598 |
| 4,177,117 | A * | 12/1979 | Kerby | 205/337 |
| 4,404,022 | A * | 9/1983 | Godbehere | 241/79 |
| 4,581,064 | A * | 4/1986 | Morrison et al. | 75/631 |
| 5,232,486 | A * | 8/1993 | Evans et al. | 75/380 |
| 7,670,575 | B2 * | 3/2010 | Jarvinen et al. | 423/1 |
| 2009/0120236 | A1 * | 5/2009 | Lagos et al. | 75/10.14 |
| 2012/0247509 | A1 * | 10/2012 | Lin et al. | 134/13 |

OTHER PUBLICATIONS

Ojebuoboh, F., "Bismuth-Production, Properties, and Applications", 1992 Review of Extractive Metallurgy, JOM, vol. 44, No. 4, Apr. 1992, pp. 46-49.*

Deng, Z. H., and Yongnian Dai. "New technique of desilverization from crude bismuth by vacuum distillation." Chinese Journal of Nonferrous Metals(China) vol. 7, No. 3 (1997) pp. 52-55.*

* cited by examiner

PROCESS FOR RECOVERING VALUABLE METALS FROM PRECIOUS METAL SMELTING SLAG

RELATED APPLICATIONS

This application claims priority to Chinese Application No. 201210229667.X, filed Jul. 3, 2012, which is incorporated herein by reference in its entirety.

TECHNICAL FIELD

The present invention relates to the field of metal recovery technology, in particular, to a process for recovery valuable metals from precious metal smelting slag.

BACKGROUND

Precious metals possess unique physical and chemical properties, which are widely used in various fields, such as military industry, petroleum, chemical industry, organic synthesis, microelectronic technology, exhaust gas purifying or the like, and play an irreplaceable role in the modern high-tech industries. If the content of precious metal in the precious metal ore is in the order of gram/ton, the precious metal ore can be classified as a rich ore, and is valuable to be industrially exploited. In some smelting slag produced by pyrometallurgy processing of precious metals, especially in the smelting slag produced by pyrometallurgy processing of copper anode slime and lead anode slime, it is rich in valuable metals such as gold, silver, bismuth and lead. For example, the smelting slag, which is produced by pyrometallurgy processing of copper anode slime and lead anode slime with Kaldo furnace, comprises the components of (by mass): Au ranging from 10 to 1000 g/t, Ag ranging from 0.05 to 4%, Bi ranging from 1 to 10%, Pb of more than 10%, Cu ranging from 0 to 1.5%, Sb ranging from 0 to 4%, and As ranging from 0 to 3%. The smelting slag produced by precious metal of pyrometallurgy processing has a relatively high content of the valuable metals, and is a good raw material for comprehensive recovery of valuable metals such as gold, silver, bismuth, lead or the like, thereby the recycle of precious metal smelting slag is of importance for solving the problem of severe shortage of precious metal resources.

In general, the processes for treating the precious metal smelting slag is that slag returns to the lead smelting system or copper smelting system of smelting plant to further recover gold and silver. However, neither the lead smelting system nor the copper smelting system can realize a comprehensive recovery of precious metals from precious metal smelting slag. For example, the lead smelting system can only recover gold, silver and lead without effective bismuth recovery, meanwhile, with a long recovery time and low recovery rate; the copper smelting system can only recover gold and silver, but fail to recover lead and bismuth, also, returning to the copper smelting system will produce vicious circle formed by lead in the large system, which influences copper smelting system and copper electrolysis system. In addition, the process time is long and the recovery rate is low. The inventors envision providing a process for recovering valuable metals from precious metal smelting slag, comprehensively recovering gold, silver, bismuth and lead in the precious metal smelting slag with a high recovery rate.

SUMMARY OF THE EMBODIMENTS

In view of this, a problem to be solved by the present invention is to provide a process for recovering valuable metals from precious metal smelting slag, comprehensively recovering gold, silver, bismuth and lead in the precious metal smelting slag with a high recovery rate.

To solve the above technical problem, the present invention herein provides a process for recovering valuable metals from precious metal smelting slag, comprising the following steps:

a) Smelting the precious metal smelting slag and a flux in a top-blown rotary furnace to produce a lead-bismuth alloy, the precious metal smelting slag comprises Au, Ag, Bi and Pb, the flux comprises 1 to 7 parts by weight of coke powder, 1 to 7 parts by weight of sodium carbonate, 0 to 7 parts by weight of silica sand, 1 to 6 parts by weight of quicklime, 1 to 5 parts by weight of iron powder and 0 to 20 parts by weight of lead oxide, with respect to 100 parts by weight of the precious metal smelting slag; and b) Electrolyzing the resultant lead-bismuth alloy at a current density ranging from 60 to 110 A/m2 to produce cathode lead and lead anode slime, respectively;

c) Refining the lead anode slime to produce bismuth and silver-zinc crust respectively; and d) Extracting gold and silver separately from the silver-zinc crust.

Preferably, the precious metal smelting slag comprises the following elements and contents thereof:

Au ranging from 0.01 to 1 wt %;
Ag ranging from 0.05 to 4 wt %;
Bi ranging from 1 to 10 wt %;
Pb more than 10 wt %;
Cu ranging from 0 to 1.5 wt %;
Sb ranging from 0 to 4 wt %;
As ranging from 0 to 3 wt %.

Preferably, the step a) particularly comprises:

Smelt the precious metal smelting slag and flux in a top-blown rotary furnace to produce a lead-bismuth alloy, reducing slag, copper slag, arsenic-antimony slag and smoking dust. The precious metal smelting slag comprises Au, Ag, Bi and Pb. The particle size of the precious metal smelting slag is between 50 and 100 mesh and the smelting temperature is between 850 and 1300° C. The gold and silver contents in the reducing slag are controlled to be less than 1 g/t and less than 100 g/t respectively. The flux comprises 1 to 7 parts by weight of coke powder, 1 to 7 parts by weight of sodium carbonate, 0 to 7 parts by weight of silica sand, 1 to 6 parts by weight of quicklime, fl to 5 parts by weight of iron powder and from 0 to 20 parts by weight of lead oxide, with respect to 100 parts by weight of the precious metal smelting slag.

Preferably, the step b) particularly comprises:

With the lead-bismuth alloy as the anode, an lead starting sheet as the cathode, and a liquid mixture of lead fluorosilicate and fluorosilicic acid as an electrolyte, electrolyzing the resultant lead-bismuth alloy at a current density ranging from 60 to 110 A/m2 to produce cathode lead and lead anode slime, respectively.

Preferably, the step c) particularly comprises:

Allowing the lead anode slime to sequentially subject to copper removal treatment, arsenic-antimony removal treatment, basic refining, adding zinc to remove silver and chloridizing refining treatment to produce bismuth liquor; and Adding caustic soda and potassium nitrate to the bismuth liquor, so as to produce bismuth and silver-zinc crust.

Preferably, the step d) particularly comprises:

d1) Allowing the silver-zinc crust to subject to vacuum distillation treatment and then condensation, so as to produce precious metal-rich lead alloy and zinc;

d2) Blowing the precious metal-rich lead alloy with a top-blown rotary furnace, to produce gold-silver alloy; and d3) Electrolyzing the gold-silver alloy, so as to produce gold and silver.

Preferably, the temperature of vacuum distillation is between 600 and 900° C., and the temperature of condensation is between 350 and 500° C. in step d1).

Preferably, the step d3) particularly comprises:

With the gold-silver alloy as the anode, stainless steel cathode plate as the cathode, the aqueous solution of silver nitrate and nitric acid as an electrolyte, electrolyzing the gold-silver alloy by applying direct current (DC) to an electrolytic cell, to produce silver and silver anode slime;

Allowing the silver anode slime to sequentially subject to preleaching treatment with diluted hydrochloric acid, leaching processing for separating hydrochloric acid and chlorine gas, to produce filtrate; and Mixing the filtrate with sodium bisulfite so as to obtain gold after reaction.

Preferably, the zinc obtained from step d1) is used for the refining treatment of lead anode slime in step c).

Preferably, the recovery rate is more than 95% for gold, more than 95% for silver, more than 90% for lead, and more than 90% for bismuth.

The present invention herein provides a process for recovering valuable metals from precious metal smelting slag, comprising the following steps: Smelting the precious metal smelting slag and a flux in a top-blown rotary furnace to produce a lead-bismuth alloy, wherein the precious metal smelting slag comprises Au, Ag, Bi and Pb; electrolyzing the lead-bismuth alloy at a current density ranging from 60 to 110 A/m2 to produce lead cathode and lead anode slime; refining the lead anode slime to produce bismuth and silver-zinc crust; and extracting gold and silver separately from the silver-zinc crust. Comparing with the prior art, the present invention enables the valuable metals such as gold, silver, bismuth, lead or the like to be rich in lead-bismuth alloy, and make the gold, silver, bismuth and lead be low in contents in the reducing slag and thereby increase the comprehensive recovery rates of gold, silver, bismuth and lead in the precious metal smelting slag, by utilizing a top-blown rotary furnace as the smelting apparatus and adjusting the ratio of flux. The experimental results show that the process according to the present invention can realize a recovery rate of more than 95% for gold, more than 95% for silver, more than 90% for lead, and more than 90% for bismuth.

DETAILED DESCRIPTION

Unless otherwise indicated, all numbers expressing quantities of ingredients, dimensions reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

The technical solutions in examples of the present invention will be clearly and fully described below. Apparently, the embodiments described are only for further illustrating the characteristics and advantages of the present invention, but not for limiting the claims of the present invention. All the other embodiments acquired by those skilled in the art without making creative labor based on the embodiments of the invention, will fall into the protection scope of the invention. All references cited herein are incorporated in their entirety by reference.

The present invention herein provides a process for recovering valuable metals from precious metal smelting slag, comprising the following steps: a) Smelting the precious metal smelting slag and a flux in a top-blown rotary furnace to produce a lead-bismuth alloy, wherein the precious metal smelting slag comprises Au, Ag, Bi and Pb; and the flux comprises 1 to 7 parts by weight of coke powder, 1 to 7 parts by weight of sodium carbonate, 0 to 7 parts by weight of silica sand, 1 to 6 parts by weight of quicklime, 1 to 5 parts by weight of iron powder and 0 to 20 parts by weight of lead oxide, with respect to 100 parts by weight of the precious metal smelting slag; b) Electrolyzing the lead-bismuth alloy at a current density ranging from 60 to 110 A/m2 to produce lead cathode and lead anode slime; c) Refining the lead anode slime to produce bismuth and silver-zinc crust; and d) Extracting gold and silver separately from the silver-zinc crust.

In the recovery process above, the present invention enrichs the valuable metals gold, silver, bismuth, lead or the like in lead-bismuth alloy, and make the gold, silver, bismuth and lead be low in contents in the reducing slag, and thereby increase the comprehensive recovery rates of gold, silver, bismuth and lead in the precious metal smelting slag by utilizing a top-blown rotary furnace as the smelting apparatus and adjusting the ratio of flux.

The precious metal smelting slag used in the present invention is preferably a smelting slag produced by pyrometallurgy processing of copper anode slime and lead anode slime, which are rich in valuable metals gold, silver, bismuth, lead or the like, and more preferably, the smelting slag is produced by pyrometallurgy processing of copper anode slime and lead anode slime with Kaldo furnace. Preferably, the precious metal smelting slag comprises the following elements and contents thereof: Au ranging from 0.01 to 1 wt %; Ag ranging from 0.05 to 4 wt %; Bi ranging from 1 to 10 wt %; Pb more than 10 wt %; Cu ranging from 0 to 1.5 wt %; Sb ranging from 0 to 4 wt %; and As ranging from 0 to 3 wt %.

Firstly, the precious metal smelting slag is treated with a top-blown rotary furnace to produce lead-bismuth alloy. The step a) particularly comprises: Smelting the precious metal smelting slag and a flux in a top-blown rotary furnace to produce a lead-bismuth alloy, reducing slag, copper dross, arsenic-antimony dross and smoking dust. The precious metal smelting slag comprises Au, Ag, Bi and Pb. The particle size of the precious metal smelting slag is between 50 and 100 mesh. The smelting temperature is between 850 and 1300° C., preferably between 850 and 1100° C. The gold and silver contents in the reducing slag are controlled to be less than 1 g/t and less than 100 g/t respectively. The flux comprises 1 to 7 parts by weight of coke powder, 1 to 7 parts by weight of sodium carbonate, 0 to 7 parts by weight of silica sand, 1 to 6 parts by weight of quicklime, 1 to 5 parts by weight of iron powder and 0 to 20 parts by weight of lead oxide, with the precious metal smelting slag to be 100 parts by weight. According to a preferred embodiment, the flux comprises 2 to 6 parts by weight of coke powder, 2 to 6 parts by weight of sodium carbonate, 0 to 5 parts by weight of silica sand, 2 to 5 parts by weight of quicklime, 2 to 4 parts by weight of iron powder and 2 to 15 parts by weight of lead oxide. By controlling the particle size of the precious metal smelting slag, the present invention guarantees the transmission of materials and saves the time and energy for melting the materials. Meanwhile, the proportion of flux above and the reaction temperature facilitate to ensure increasing the comprehensive recovery rate and keeping the gold, silver, bismuth and lead contained in the slag at a low level.

In the process of smelting precious metal smelting slag to produce lead-bismuth alloy, it is preferred to introduce natural gas to conduct smelting. The natural gas is low in unit consumption, ranging from 80 to 100 Nm3/ton slag, making lower energy consumption possible. The top-blown rotary furnace used in the present invention is not especially limited, and the top-blown rotary furnace which is well known to those skilled in the art can be adopted. In particular, the top-blown rotary furnace is a round furnace with lining of refractory brick, which can rotate around the axis line and also may be tilting up and down, and fuel lance and converting lance may be inserted from the top of the furnace. In the process of smelting using top-blown rotary furnace, the process smoke is discharged after it passes through water-cooled flue—high efficiency spraying scrubber—wet-electric demister—air blower—absorption tower, preferably the final dust content in the discharged smoke is controlled to be less than 2 mg/Nm3, so as to meet the requirement of environmental protection. Also, the top-blown rotary furnace can work in a continuous manner and is equipped with automatic feeding system and DCS control system, which guarantees the process of the present invention having the characteristics of high degree of automation.

After obtaining lead-bismuth alloy, it is subjected to electrolysis. The step b) particularly comprises: Utilizing the lead-bismuth alloy as the anode, an lead starting sheet as the cathode, a liquid mixture of lead fluorosilicate and fluorosilicic acid as the electrolyte, electrolyzing the resultant lead-bismuth alloy at a current density ranging from 60 to 110 A/m2 to produce cathode lead and lead anode slime. The current density preferably is between 70 and 100 A/m2, and more preferably, between 80 and 100 A/m2. More preferably, the following parameters are controlled in the invention: (1) The lead-bismuth alloy prepared in step a) preferably has more than 90% of sum of lead and bismuth, in which the content of bismuth being between 8 and 30%, the content of copper being less than 0.4% m, and the content of antimony being between 0.5 and 1.5%; (2) The current density of cathode: 60~110 A/m2; (3) Homopolarity distance: concentric distance is 70~100 mm; (4) Additives: β-naphthol and animal glue; (5) Fresh solution for circulation: in the fresh acid solution, the concentration of free acid is ranging from 200 to 300 g/l and the concentration of lead ions is ranging from 200 to 300 g/l; and (6) products of electrolysis: cathode lead containing 99.94% lead, residual anode (return to anode casting) and lead anode slime.

In the products of electrolysis, the cathode lead has a relatively high content of lead, thus lead recovery is realized. Further, the lead anode slime produced by electrolysis is subjected to refining treatment. Step c) preferably comprises: c1) allowing the lead anode slime to sequentially subject to copper removal treatment, arsenic-antimony removal treatment, basic refining, adding zinc to remove silver and chloridizing refining treatment to produce bismuth liquor; and c2) Adding caustic soda and potassium nitrate into the bismuth liquor, and produce bismuth and silver-zinc crust after reaction. The lead anode slime has a relatively high content of bismuth, which thus is also referred as crude bismuth. Prior to copper removal, performing a step of charging and melting firstly, in particular: the lead anode slime (crude bismuth) is charged into a first refining kettle, and melted at 500 to 600° C. for 4 h, and the smelting slag is removed as the temperature rises to 600° C.

According to the present embodiment, in the step c):

(1) The copper removal treatment particularly comprises: in the first refining kettle, by utilizing the property that the solubility of copper in bismuth liquor varies with the temperature, the temperature of the first refining kettle is controlled to be 500° C. such that the copper is converted into a refractory compound or eutectic solid solution in the form of scum, which can be removed. That is, 50% of copper can be removed through the above liquation. However, because the residual copper content may still be more than 0.3%, sulphur is additionally added under stifling to remove copper. During the addition of sulphur, the temperature is controlled to be from 280 to 330° C. By utilizing the property that cuprous sulfide formed by sulphur and copper is insoluble in bismuth liquor and has a low density, cuprous sulfide can be removed and residual copper will be removed in following process. Lastly, when the temperature rises to 650° C., compressed air is blown in to oxidize the residual sulphur to SO2 gas. Thus the copper removal process is completed.

(2) In the arsenic-antimony removal treatment, it preferably uses blowing-oxidation refining to remove arsenic and antimony, in particular: in the first refining kettle, arsenic and antimony are removed by oxidation refining. Due to the large difference between the free enthalpies of oxides of arsenic and antimony and the free enthalpy of oxide of bismuth, when the temperature rises to 680-750° C., compressed air is blown in to preferentially oxidize arsenic and antimony to arsenic oxide and antimony oxide while bismuth liquor is volatilized out, thus arsenic and antimony are removed. Preferably, the reaction is carried out for 6 hours until the volatilized white smoke becomes thin, and then the scum is removed. If the scum is thin, appropriate amount of caustic soda or wood chips can be added to dry out the scum, which facilitates removal of the scum.

(3) The step of basic refining particularly includes: The bismuth liquid is transfered into a second refining kettle from the first refining kettle through a bismuth pump to subject a basic refining, after the arsenic and antimony removal by oxidation refining; in the basic refining, oxides of tellurium and tin react with caustic soda to generate sodium tellurite and sodium selenite with low melting points, which take the form of scum, thus can be removed. This process comprises two steps. The first step is tellurium removal: as the temperature of bismuth liquor decreases to 500-520° C., caustic soda is added at a weight of 1.5-2.0% with respect of the weight of the bismuth liquor in several times; after melting, compressed air is blown in under stirring to carry out a reaction for 6-10 hours until the scum does not become dry, and at this point, the tellurium content has already decreased to about 0.05%. The second step is tin removal: as the temperature of bismuth liquor decreases to 450° C., NaOH and NaCl are charged and melted, which cover the surface the bismuth liquor; compressed air is blown into the generated solution for 20 min with stirring, and then NaNO3 is charged; the blowing is continued for additional 30 min, then the scum is removed.

(4) The step of charging zinc to remove silver particularly includes: The bismuth liquor after basic refining, is transferred into a third refining kettle from the second refining kettle through a bismuth pump so as to subject to the step of adding zinc to remove silver. The process is done at low temperature of 420-500° C. Adding zinc to remove silver is based on the fact that the stable refractory compound which can be removed as scum due to low density is formed by the reaction between zinc and silver. The degree of silver removal has a large influence on the quality of refined bismuth and recovery rate. The process is completed when the bismuth liquor contains less than 0.003% of silver. The resultant gold-silver-zinc crust returns to Kaldo furnace for further treatment.

(5) The chloridizing refining treatment particularly includes: the bismuth liquor after adding zinc to remove silver, is transferred into a fourth refining kettle from the third refining kettle through a bismuth pump. The chlorine gas is introduced into the fourth refining kettle by a glass tube inserted into the bismuth liquor. Chlorine is capable of reacting with the lead in bismuth liquor to form PbCl2, which has a density of 2.91 g/cm3 and less than that of bismuth liquor, that is, 10 g/cm3; thus PbCl2 can be removed as offwhite scum.

After the above steps (1) to (5) are finished, caustic soda and potassium nitrate are added to the bismuth liquor:

In particular, the bismuth liquor after chloridizing refining, is transferred into a fifth refining kettle from the fourth refining kettle through a bismuth pump. Caustic soda and potassium nitrate are added to remove minor amounts of Cl, Zn, As, Sb, Pb and Te. At last, bismuth liquor with 99.99% purity is obtained and casted into ingots, realizing the recovery of bismuth.

According to the present invention, the step d) particularly comprises: d1) Allowing the silver-zinc crust prepared in the previous step to subject to vacuum distillation treatment to produce precious metal-rich lead alloy and zinc after condensation; d2) Blowing the precious metal-rich lead alloy with a top-blown rotary furnace, so as to produce gold-silver alloy; and d3) Electrolyzing the gold-silver alloy to produce gold and silver; wherein the temperature of vacuum distillation is between 600 and 900° C., and the temperature of condensation is between 350 and 500° C. in step d1).

The purpose of converting the lead alloy in step d2) is to obtain a gold-silver alloy with a purity of larger than 98%, thereby meeting the requirement of silver electrolysis technology. The step d3) particularly comprises: with the gold-silver alloy as the anode, stainless steel sheet as the cathode, the aqueous solution of silver nitrate and nitric acid as the electrolyte, electrolyzing the gold-silver alloy by applying DC to electrolytic cell, so as to produce silver and silver anode slime; allowing the silver anode slime to sequentially subject to preleaching treatment of diluted hydrochloric acid, leaching treatment of hydrochloric acid and chlorine gas, to produce filtrate; and mixing the filtrate with sodium bisulfite to obtain gold sand after reaction. Preferably, the gold sand is casted into gold ingots.

As a preferred embodiment, it further comprises: the zinc produced from step d1) is used for the refining treatment of lead anode slime in step c), thus realizing the recycle of zinc.

As can be seen from the above embodiment, the present invention enrichs the valuable metals such as gold, silver, bismuth, lead or the like in lead-bismuth alloy, and make the gold, silver, bismuth and lead be low in contents in the reducing slag and thereby increase the comprehensive recovery rates of gold, silver, bismuth and lead in the precious metal smelting slag, by utilizing a top-blown rotary furnace as the smelting apparatus and adjusting the proportion of flux. The experimental results show that the process according to the present invention can realize a recovery rate of more than 95% for gold, more than 95% for silver, more than 90% for lead, and more than 90% for bismuth.

To further illustrate the technical solutions of the present invention, the preferred embodiments of the invention will be described in conjunction with examples below. However, it should be understood that these descriptions are only provided to further illustrate the features and advantages of the invention, rather than to limit the appended claims.

EXAMPLES

Example 1

Figure 1:
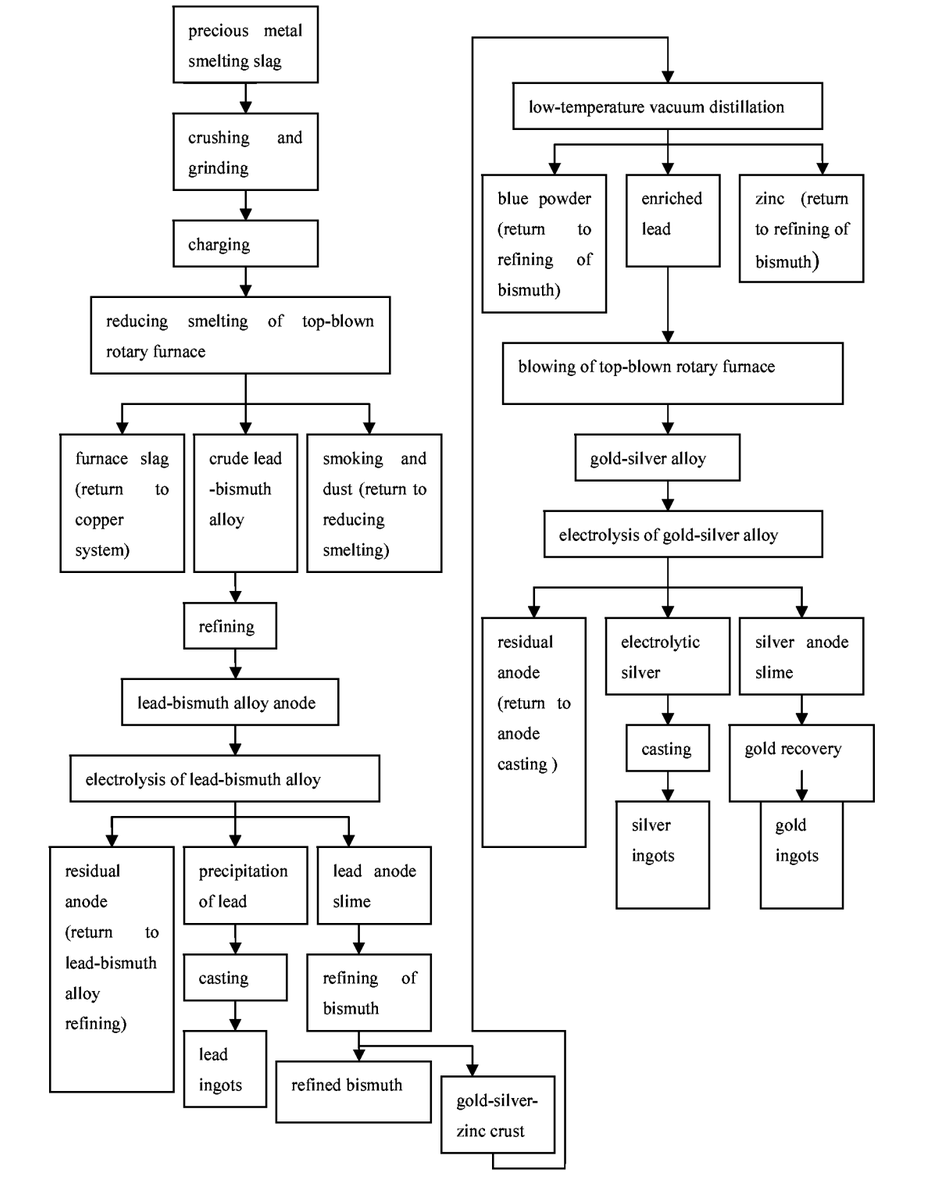
FIG. 1 is a flow chart of a process for recovering valuable metals from the precious metal smelting slag disclosed in Example 1 of the present invention.

FIG. 1 shows a flow chart of the process for recovering valuable metals from precious metal smelting slag according to an embodiment of the present invention.

TABLE 1

Some elements and the contents thereof in precious metal smelting slag in Example 1

| Element | Au | Ag | Bi | Pb | Cu | Sb | As | $SiO_2$ |
|---|---|---|---|---|---|---|---|---|
| Content | 500 g/t | 1% | 6.4% | 45% | 0.3% | 1% | 1% | 10% |

Lead-Bismuth Alloy Produced from Precious Metal Smelting Slag

Some elements and the contents thereof in precious metal smelting slag used in example 1 is shown in Table 1. The precious metal smelting slag is ground to be 100 meshes via two-stage crushing, and then the ground precious metal smelting slag is carried into a top bin of a top-blown rotary furnace such as by means of pneumatic conveying. Material inside of top bin, such as precious metal smelting slag and a flux such as quartz, sodium carbonate, quicklime, coke powder, and lead oxide, is fed automatically into the top-blown rotary furnace through a mechanical feeding system. The reducing smelting was conducted at 850-1300° C. by inserting a combustion lance. After the completion of smelting, the slag is discharged, hot crude lead-bismuth alloy is produced and poured into lead-bismuth alloy refining furnace to remove copper, and after As and Sb removal, a refined lead-bismuth alloy fluid is obtained, which then was casted into lead-bismuth alloy anode plate in an anode casting machine.

The Flux Comprises:

7% of coke powder, 7% of sodium carbonate, 6% of quicklime, 3% of iron powder, 0% of lead oxide and 0% of silica sand (with respect to the mass of the precious metal smelting slag).

Main smelting products: lead-bismuth alloy, reducing slag, copper dross, arsenic-antimony dross and smoking dust. The reducing slag contains gold of 0.95 g/t and silver of 80 g/t, with a unit consumption of natural gas of 80 $Nm^3$/t slag. The resultant lead-bismuth alloy contains more than 90.94% of sum of Pb and Bi.

The exhaust gas is discharged after it passed through water-cooled flue—high efficiency spraying scrubber—wet-electric demister—air blower—absorption tower, and the final dust content in the discharged exhaust gas is less than 2 $mg/Nm^3$.

Electrolysis Refining of the Lead-Bismuth Alloy

The electrolysis was conducted by using the lead-bismuth alloy as the anode, an lead starting sheet as the cathode, a liquid mixture of lead fluorosilicate and fluorosilicic acid as the electrolyte and applying DC to an electrolytic cell.

(1) Composition of the Lead-Bismuth Alloy

TABLE 2

Composition of the lead-bismuth alloy obtained in Example 1

| Pb | Bi | Cu | As | Sb | Sn | Au | Ag |
|---|---|---|---|---|---|---|---|
| 79.56% | 11.38% | 0.2% | 0.24% | 1.07% | 0.26% | 930 g/t | 1.85% |

(2) Current Density of Cathode

The current density is low, that is, 80 A/m$^2$.

(3) Distance Between the Homopolarities 90 mm.

(4) Additives

β-naphthol.

(5) Fresh Solution for Circulation

In the fresh acid solution, the concentration of free acid was 300 g/l and the concentration of lead ions was 300 g/l.

(6) Products of Electrolysis

Cathode lead containing 99.94% of lead, residual anode (return to anode casting) and lead anode slime.

Lead Anode Slime Treatment

The lead anode slime produced from electrolysis of lead-bismuth alloy is dried, and the dried lead anode slime is fed into an electrical furnace for melting, copper removal, arsenic-antimony removal, basic refining, adding zinc to remove silver, chloridizing refining and final refining, so as to produce refined bismuth and silver-zinc crust.

(1) Feeding and Melting

The crude bismuth is fed into the first refining kettle, and melted at 500 to 600° C. for 4 h, and the smelting slag is removed as the temperature rose to 600° C.

(2) Copper Removal Process

In the first refining kettle, by utilizing the property that the solubility of copper in bismuth liquor varies with the temperature, the temperature of the first refining kettle was controlled to be 500° C. such that the copper was converted into a refractory compound or eutectic solid solution in the form of scum, which was removed subsequently. That is, 50% of copper can be removed through the above liquation. However, because the residual copper content was still more than 0.3%, sulphur was additionally added under stifling to remove copper. During the addition of sulphur, the temperature was controlled to be 300° C. By utilizing the property that cuprous sulfide formed by sulphur and copper is insoluble in bismuth liquor and has a low density, cuprous sulfide was removed and residual copper was removed in following process. Lastly, when the temperature rose to 650° C., compressed air is blown in to oxidize the residual sulphur into SO$_2$ gas. Thus the copper removal process was completed.

(3) Arsenic and Antimony Removal by Blowing-Oxidation Refining in the first refining kettle, arsenic and antimony are removed by oxidation refining. Due to the large difference between the free enthalpies of oxides of arsenic and antimony and the free enthalpy of oxide of bismuth, when the temperature rises to 680-750° C., compressed air is blown in to preferentially oxidize arsenic and antimony into arsenic oxide and antimony oxide while bismuth liquor is volatilized out, thus arsenic and antimony are removed. Preferably, the reaction is carried out for 6 hours until the volatilized white smoke become thin, and then the scum is removed. If the scum is thin, appropriate amount of caustic soda or wood chips can be added to dry out the scum, which will facilitate removal of the scum.

(4) Basic Refining

The bismuth liquor, after the arsenic and antimony removal by oxidation refining, is transferred into a second refining kettle from the first refining kettle through a bismuth pump to subject a basic refining; in the basic refining, oxides of tellurium and tin react with solid caustic soda to generate sodium tellurite and sodium selenite with low melting points, which take the form of scum, thus can be removed. This process comprises two steps. The first step is tellurium removal: as the temperature of bismuth liquor decreases to 500-520° C., solid caustic soda is added at a weight of 1.5-2.0% with respect of the weight of the bismuth liquor in several times; after melting, compressed air is blown in under stifling to carry out a reaction for 6-10 hours until the scum is not become dry, and at this point, the tellurium content has already decreased to about 0.05%. The second step is tin removal: as the temperature of bismuth liquor decreases to 450° C., NaOH and NaCl are added and melted, and cover the surface of the bismuth liquor; compressed air is blown into the generated solution for 20 min with stirring, and then NaNO$_3$ is added; the blowing continues for additional 30 min, then the scum is removed.

(5) Adding Zinc to Remove Silver

The bismuth liquor after basic refining is transferred into a third refining kettle from the second refining kettle through a bismuth pump so as to subject to the step of adding zinc to remove silver. The process is done at low temperature of 450° C. Adding zinc to remove silver is based on the fact that the stable refractory compound which can be removed as scum due to low density is formed by the reaction between zinc and silver. The degree of silver removal has a large influence on the quality of refined bismuth and recovery rate. The process is completed when the bismuth liquor contains less than 0.003% of silver. The resultant gold-silver-zinc crust returns to Kaldo furnace for further treatment.

(6) Chloridizing Refining

The bismuth liquor, after adding zinc to remove silver, is transferred into a fourth refining kettle from the third refining kettle through a bismuth pump. The chlorine gas is introduced into the fourth refining kettle by a glass tube inserted into the bismuth liquor. Chlorine is capable of reacting with the lead in bismuth liquor to form PbCl$_2$, which has a density of 2.91 g/cm$^3$ and less than that of bismuth liquor, that is, 10 g/cm$^3$; thus PbCl$_2$ is removed as offwhite scum.

(7) Final Refining

The bismuth liquor, after chloridizing refining, is transferred into a fifth refining kettle from the fourth refining kettle through a bismuth pump. Caustic soda and potassium nitrate are added to remove minor amount of Cl, Zn, As, Sb, Pb and Te. At last, bismuth liquor with 99.99% purity is obtained and then is casted into ingots, realizing the recovery of bismuth.

Treatment of Gold-Silver-Zinc Crust

TABLE 3

Some elements and the contents thereof in gold-silver-zinc crust obtained in Example 1

| Pb | Bi | Cu | As | Sb | Zn | Au | Ag |
|---|---|---|---|---|---|---|---|
| 2.2% | 10.3% | 0.39% | 0.47% | 0.56% | 53.4% | 1.2% | 19.85% |

The gold-silver-zinc crust after squeezing out liquid bismuth via a presser is transferred into a vacuum-distillation furnace for zinc removal. Under the conditions of negative pressure of 2 kPa, distillation furnace temperature of 800° C. and condenser temperature of 480° C., precious metal-rich lead alloy, and zinc and blue powder with a purity of 98.4% are produced. The zinc and blue powder return to the process of adding zinc to remove silver in the lead anode slime treatment.

After blowing the precious metal-rich lead alloy via the top-blown rotary furnace, a gold-silver alloy with sum of gold and silver more than 98% is produced. The electrolysis is conducted by using the gold-silver alloy as the anode, stainless steel sheet as the cathode, the aqueous solution of silver nitrate and nitric acid as the electrolyte, and applying DC to an electrolytic cell. The electrolysis refining produces silver cathode, residual anode and silver anode slime. 99.99% (purity) of silver ingots are obtained by casting the silver cathode.

The silver anode slime is subject to preleaching treatment of diluted hydrochloric acid solution to remove most of the impurities. Then hydrochloric acid and chlorine gas are used to leach and dissolve the anode lime, and only the generated silver chloride and some insoluble impurities are deposited. Next, sodium bisulfite is used to precipitate out gold from the filtrate. The precipitated gold sand is filtered, washed and further dried to produce 99.99% (purity) of gold sand, 99.99% of gold ingot is thus obtained by casting the gold sand.

The recovery rates of valuable metals and associated parameters in this example are as shown in Table 4.

TABLE 4

Recovery rates of valuable metals and performance parameters in Example 1

| No. | Item | Unit | Results |
|---|---|---|---|
| 1 | Recovery rate of lead | % | ≥90 |
| 2 | Recovery rate of bismuth | % | ≥90 |
| 3 | Recovery rate of gold | % | ≥95 |
| 4 | Recovery rate of silver | % | ≥95 |
| 5 | Lead in slag | % | <3 |
| 6 | Bismuth in slag | % | <0.1% |
| 7 | Silver in slag | g/t | <100 |
| 8 | Gold in slag | g/t | <1 |
| 9 | Unit consumption of natural gas | $Nm^3/t$ | 80-100 |
| 10 | Unit consumption of zinc | Kg/t bismuth | <50 |
| 11 | Dust in discharged smoke | $Mg/Nm^3$ | <2 |

Example 2

TABLE 5

Some elements and the contents thereof in precious metal smelting slag in Example 2

| Element | Au | Ag | Bi | Pb | Cu | Sb | As | $SiO_2$ |
|---|---|---|---|---|---|---|---|---|
| Content | 100 g/t | 0.4% | 8% | 30% | 0.3% | 1.2% | 1.8% | 5% |

Lead-Bismuth Alloy Produced from Precious Metal Smelting Slag

The precious metal smelting slag is ground to be 70 meshes via two-stage crushing, and then the ground precious metal smelting slag is carried into a top bin of a top-blown rotary furnace such as by means of pneumatic conveying. The material inside of top bin, such as precious metal smelting slag, and flux such as quartz, sodium carbonate, quicklime, coke powder, and lead oxide, is automatically fed on the basis of charge ratio into the top-blown rotary furnace through a mechanical feeding system. The reducing smelting is conducted at 850-1100° C. by inserting a combustion lance. After the completion of smelting, the slag is discharged, hot crude lead-bismuth alloy is produced. Then the hot crude lead-bismuth alloy is poured into lead-bismuth alloy refining furnace to remove copper, and after As and Sb removal, obtain a refined lead-bismuth alloy fluid is obtained, which then is casted into lead-bismuth alloy anode plate in an anode casting machine.

The Flux Comprises:

4% of coke powder, 2% of sodium carbonate, 7% of quicklime, 3% of iron powder, 10% of lead oxide and 0% of silica sand (with respect to the mass of the precious metal smelting slag).

Main smelting products are: lead-bismuth alloy, reducing slag, copper dross, arsenic-antimony dross and smoking and dust. The reducing slag contains gold of 0.6 g/t and silver of 98 g/t, with a unit consumption of natural gas of 80 Nm3/t slag. The resultant lead-bismuth alloy contains more than 90.94% of sum of Pb and Bi.

The smoke is discharged after it passed through water-cooled flue—high efficiency spraying scrubber—wet-electric demister—air blower—absorption tower, and the final dust content in the discharged smoke is less than 2 mg/Nm3.

Electrolysis Refining of the Lead-Bismuth Alloy

The electrolysis is conducted by using the lead-bismuth alloy as the anode, a lead starting sheet as the cathode, a liquid mixture of lead fluorosilicate and fluorosilicic acid as the electrolyte and applying DC to an electrolytic cell.

(1) Composition of the Lead-Bismuth Alloy

TABLE 6

Composition of the lead-bismuth alloy obtained in Example 2

| Pb | Bi | Cu | As | Sb | Sn | Au | Ag |
|---|---|---|---|---|---|---|---|
| 76.5% | 16% | 0.3% | 0.32% | 1.3% | 0.35% | 198 g/t | 0.8% |

(2) Current Density of Cathode

The current density is low, that is, 60 $A/m^2$.

(3) Distance Between the Homopolarities 90 mm.

(4) Additives

Animal glue (5) Fresh Solution for Circulation

In the fresh acid solution, the concentration of free acid is 300 g/l and the concentration of lead ions is 300 g/l.

(6) Products of Electrolysis

Cathode lead containing 99.94% of lead, residual anode (return to anode casting) and lead anode slime.

Lead Anode Slime Treatment

The lead anode slime produced from electrolysis of lead-bismuth alloy is dried, and the dried lead anode slime is fed into an electrical furnace for melting, copper removal, arsenic-antimony removal, basic refining, adding zinc to remove silver, chloridizing refining and final refining, so as to produce refined bismuth and silver-zinc crust.

(1) Feeding and Melting

The crude bismuth is fed into the first refining kettle, and melted at 500 to 600° C. for 5 h, and the smelting slag is removed as the temperature rises to 600° C.

(2) Copper Removal Process

In the first refining kettle, by utilizing the property that the solubility of copper in bismuth liquor varies with the temperature, the temperature of the first refining kettle is controlled to be 500° C. such that the copper is converted into a refractory compound or eutectic solid solution in the form of scum, which is removed subsequently. That is, 50% of copper can be removed through the above liquation. However, because the residual copper content is still more than 0.3%, sulphur is additionally added under stifling to remove copper. During the addition of sulphur, the temperature is controlled to be 280-330° C. By utilizing the property that cuprous sulfide formed by sulphur and copper is insoluble in bismuth liquor and has a low density, cuprous sulfide is removed and residual copper is removed in following process. Lastly, when the temperature rises to 650° C., compressed air is blown in to oxidize the residual sulphur into $SO_2$ gas. Thus the copper removal process is completed.

(3) Arsenic and Antimony Removal by Blowing-Oxidation Refining

In the first refining kettle, arsenic and antimony are removed by oxidation refining. Due to the large difference between the free enthalpies of oxides of arsenic and antimony and the free enthalpy of oxide of bismuth, when the temperature rises to 680-750° C., compressed air is blown in to preferentially oxidize arsenic and antimony into arsenic oxide and antimony oxide while bismuth liquor is volatilized out, thus arsenic and antimony are removed. Preferably, the reaction is carried out for 6 hours until the volatilized white smoke become thin, and then the scum is removed. If the scum is thin, appropriate amount of caustic soda or wood chips can be added to dry out the scum, which will facilitate removal of the scum.

(4) Basic Refining

The bismuth liquor, after the arsenic and antimony removal by oxidation refining, is transferred into a second refining kettle from the first refining kettle through a bismuth pump to subject a basic refining; in the basic refining, oxides of tellurium and tin react with solid caustic soda to generate sodium tellurite and sodium selenite with low melting points, which took the form of scum, thus can be removed. This process comprises two steps. The first step is tellurium removal: as the temperature of bismuth liquor decreases to 500-520° C., solid caustic soda is added at a weight of 1.5-2.0% with respect of the weight of the bismuth liquor in several times; after melting, compressed air is blown in under stifling to carry out a reaction for 7 hours until the scum does not become dry, and at this point, the tellurium content has already decreased to about 0.05%. The second step is tin removal: as the temperature of bismuth liquor decreases to 450° C., NaOH and NaC are added and melted, and cover the surface of the bismuth liquor; compressed air is blown into the generated solution for 15-20 min with stirring, and then $NaNO_3$ is added; the blowing is continued for additional 30 min, then the scum is removed.

(5) Adding Zinc to Remove Silver

The bismuth liquor after basic refining, is transferred into a third refining kettle from the second refining kettle through a bismuth pump so as to subject to the step of adding zinc to remove silver. The process is done at low temperature of 420-500° C. Adding zinc to remove silver is based on the fact that the stable refractory compound is formed by the reaction between zinc and silver, and the stable refractory compound can be removed as scum due to low density. The degree of silver removal has a large influence on the quality of refined bismuth and recovery rate. The process is completed when the bismuth liquor contains is less than 0.003% of silver. The resultant gold-silver-zinc crust returned to Kaldo furnace for further treatment.

(6) Chloridizing Refining

The bismuth liquor, after adding zinc to remove silver, is transferred into a fourth refining kettle from the third refining kettle through a bismuth pump. The chlorine gas is introduced into the fourth refining kettle by a glass tube inserted into the bismuth liquor. Chlorine is capable of reacting with the lead in bismuth liquor to form $PbCl_2$, which has a density of 2.91 g/cm$^3$ and less than that of bismuth liquor, that is, 10 g/cm$^3$; thus $PbCl_2$ is removed as offwhite scum.

(7) Final Refining

The bismuth liquor, after chloridizing refining, is transferred into a fifth refining kettle from the fourth refining kettle through a bismuth pump. Caustic soda and potassium nitrate are added to remove minor amount of Cl, Zn, As, Sb, Pb and Te. At last, bismuth liquor with 99.99% purity is obtained and then is casted into ingots, realizing the recovery of bismuth.

Treatment of Gold-Silver-Zinc Crust

TABLE 7

| | Some elements and the contents thereof in gold-silver-zinc crust obtained in Example 2 | | | | | | |
|---|---|---|---|---|---|---|---|
| Pb | Bi | Cu | As | Sb | Zn | Au | Ag |
| 2.67% | 10.0% | 0.67% | 0.32% | 0.53% | 45.87% | 1.16% | 23.25% |

The gold-silver-zinc crust after squeezing out liquid bismuth via a presser is transferred into a vacuum-distillation furnace for zinc removal. Under the conditions of negative pressure of 1.5 kPa, distillation furnace temperature of 780° C. and condenser temperature of 480° C., precious metal-rich lead alloy, and a blue powder and zinc with 98.3% purity are produced. The zinc and blue powder return to the process of adding zinc to remove silver in the lead anode slime treatment.

After blowing the precious metal-rich lead alloy via the top-blown rotary furnace, a gold-silver alloy with sum of gold and silver more than 98% is produced. The electrolysis is conducted by using the gold-silver alloy as the anode, stainless steel sheet as the cathode, the aqueous solution of silver nitrate and nitric acid as the electrolyte, and applying DC to an electrolytic cell. The electrolytic refining resulted in silver cathode, residual anode and silver anode slime. 99.99% of silver ingots are obtained by casting the silver cathode.

The silver anode slime is subject to preleaching treatment of diluted hydrochloric acid solution to remove most of the impurities. Then hydrochloric acid and chlorine gas are used to leach and dissolve the anode lime, and only the generated silver chloride and some insoluble impurities are deposited. Next, sodium bisulfite is used to precipitate out gold from the filtrate. The precipitated gold sand is filtered, washed and further dried to produce 99.99% of gold sand, 99.99% of gold ingots are thus obtained by casting the gold sand.

Example 3

TABLE 8

Some elements and the contents thereof in precious metal smelting slag in Example 3

| Element | Au | Ag | Bi | Pb | Cu | Sb | As | Na$_2$CO$_3$ |
|---------|------|------|----|-----|-------|------|------|--------------|
| Content | 20 g/t | 0.2% | 3% | 10% | 0.01% | 1.6% | 1.5% | 5% |

Lead-Bismuth Alloy Produced from Precious Metal Smelting Slag

The precious metal smelting slag is ground to be 50 meshes via two-stage crushing, and then the ground precious metal smelting slag is carried into top bin of a top-blown rotary furnace such as by means of pneumatic conveying. Material inside of top bin, such as precious metal smelting slag and flux such as quartz, sodium carbonate, quicklime, coke powder, and lead oxide is automatically fed into the top-blown rotary furnace on the basis of charge ratio through a mechanical feeding system. The reducing smelting is conducted at 850-1100° C. by inserting a combustion gun. After the completion of smelting, the slag is discharged, hot crude lead-bismuth alloy is produced. Then the hot crude lead-bismuth alloy is poured into lead-bismuth alloy refining furnace to remove copper 1, As and Sb, so as to obtain a refined lead-bismuth alloy liquid, which then is casted into lead-bismuth alloy anode sheet in an anode casting machine.

The Flux Comprises:

6% of coke powder, 1% of sodium carbonate, 1% of quicklime, 3% of iron powder, 20% of lead oxide and 7% of silica sand (with respect to the mass of the precious metal smelting slag).

Main smelting products are: lead-bismuth alloy, reducing slag, copper dross, arsenic-antimony dross and smoking dust. The reducing slag contains gold of 0.3 g/t and silver of 98 g/t, with a unit consumption of natural gas of 96 Nm$^3$/t slag. The resultant lead-bismuth alloy contains more than 92.05% of sum of Pb and Bi.

The smoke is discharged after it passed through water-cooled flue—high efficiency spraying scrubber—wet-electric demister—air blower—absorption tower, and the final dust content in the discharged smoke is less than 2 mg/Nm$^3$.

Electrolysis Refining of the Lead-Bismuth Alloy

The electrolysis is conducted by using the lead-bismuth alloy as the anode, lead starting sheet as the cathode, liquid mixture of lead fluorosilicate and fluorosilicic acid as the electrolyte and applying DC to an electrolytic cell.

(1) Composition of the Lead-Bismuth Alloy

TABLE 9

Composition of the lead-bismuth alloy obtained in Example 3

| Pb | Bi | Cu | As | Sb | Sn | Au | Ag |
|-------|-------|------|-------|------|-------|--------|-------|
| 82.6% | 9.45% | 0.1% | 0.52% | 1.2% | 0.25% | 63 g/t | 0.63% |

(2) Current Density of Cathode
The current density is low, that is, 110 A/m$^2$.
(3) Distance Between the Homopolarities
90 mm.

(4) Additives
β-naphthol.
(5) Fresh Solution for Circulation
In the fresh acid solution, the concentration of free acid is 300 g/l and the concentration of lead ions is 300 g/l.
(6) Products of Electrolysis
Cathode lead contains 99.97% of lead, residual anode (return to anode casting) and lead anode slime.

Lead Anode Slime Treatment

The lead anode slime produced from electrolysis of lead-bismuth alloy is dried, and the dried lead anode slime is fed into an electrical furnace for melting, copper removal, arsenic-antimony removal, basic refining, adding zinc to remove silver, chloridizing refining and final refining, so as to produce refined bismuth and silver-zinc crust.

(1) Feeding and Melting

The crude bismuth is fed into the first refining kettle, and melted at 500 to 600° C. for 4-6 hours, and the smelting slag is removed as the temperature rises to 600° C.

(2) Copper Removal Process

In the first refining kettle, by utilizing the property that the solubility of copper in bismuth liquor varies with the temperature, the temperature of the first refining kettle is controlled to be 500° C. such that the copper is converted into a refractory compound or eutectic solid solution in the form of scum, which is removed subsequently. That is, 50% of copper can be removed through the above liquation. However, because the residual copper content is still more than 0.3%, sulphur is additionally added under stifling to remove copper. During the addition of sulphur, the temperature is controlled to be 280-330° C. By utilizing the property that cuprous sulfide formed by sulphur and copper is insoluble in bismuth liquor and has a low density, cuprous sulfide is removed and residual copper is removed in following process. Lastly, when the temperature rises to 650° C., compressed air is blown in to oxidize the residual sulphur into SO$_2$ gas. Thus the copper removal process is completed.

(3) Arsenic and Antimony Removal by Blowing-Oxidation Refining

In the first refining kettle, arsenic and antimony are removed by oxidation refining. Due to the large difference between the free enthalpies of oxides of arsenic and antimony and the free enthalpy of oxide of bismuth, when the temperature rises to 680-750° C., compressed air is blown in to preferentially oxidize arsenic and antimony into arsenic oxide and antimony oxide while bismuth liquor is volatilized out, thus arsenic and antimony are removed. Preferably, the reaction is carried out for 4-10 hours until the volatilized white smoke becomes thin, and then the scum is removed. If the scum is thin, appropriate amount of caustic soda or wood chips can be added to dry out the scum, which will facilitate removal of the scum.

(4) Basic Refining

The bismuth liquor, after the arsenic and antimony removal by oxidation refining, is transferred into a second refining kettle from the first refining kettle through a bismuth pump to subject a basic refining; in the basic refining, oxides of tellurium and tin react with solid caustic soda to generate sodium tellurite and sodium selenite with low melting points, which take the form of scum, thus can be removed. This process comprises two steps. The first step is tellurium removal: as the temperature of bismuth liquor decreases to 500-520° C., solid caustic soda is added at a weight of 1.5-2.0% with respect of the weight of the bismuth liquor in several times; after melting, compressed air is blown in under stirring to carry out a reaction for 6-10 hours until the scum does not become dry, and at this point, the tellurium content has already decreased to about 0.05%. The second step is tin removal: as the temperature of bismuth liquor decreases to 450° C., NaOH and NaCl are added and melted, and cover the surface of the bismuth liquor; compressed air is blown into the generated solution for 20 min with stirring, and then $NaNO_3$ is added; the blowing is continued for additional 30 min, then the scum is removed.

(5) Adding Zinc to Remove Silver

The bismuth liquor after basic refining, is transferred into a third refining kettle from the second refining kettle through a bismuth pump so as to subject to the step of adding zinc to remove silver. The process is done at low temperature of 420-500° C. Adding zinc to remove silver is based on the fact that the stable refractory compound which can be removed as scum due to low density is formed by the reaction between zinc and silver. The degree of silver removal has a large influence on the quality of refined bismuth and recovery rate. The process is completed when the bismuth liquor contains less than 0.003% of silver. The resultant gold-silver-zinc crust returned to Kaldo furnace for further treatment.

(6) Chloridizing Refining

The bismuth liquor, after adding zinc to remove silver, is transferred into a fourth refining kettle from the third refining kettle through a bismuth pump. The chlorine gas is introduced into the fourth refining kettle by a glass tube inserted into the bismuth liquor. Chlorine is capable of reacting with the lead in bismuth liquor to form $PbCl_2$, which has a density of 2.91 $g/cm^3$ and less than that of bismuth liquor, that is, 10 $g/cm^3$; thus $PbCl_2$ is removed as offwhite scum.

(7) Final Refining

The bismuth liquor, after chloridizing refining, is transferred into a fifth refining kettle from the fourth refining kettle through a bismuth pump. Caustic soda and potassium nitrate are added to remove minor amount of Cl, Zn, As, Sb, Pb and Te. At last, bismuth liquor with 99.99% purity is obtained and then is casted into ingots, realizing the recovery of bismuth.

Treatment of Gold-Silver-Zinc Crust

TABLE 10

Some elements and the contents thereof in gold-silver-zinc crust obtained in Example 3

| Pb | Bi | Cu | As | Sb | Zn | Au | Ag |
|---|---|---|---|---|---|---|---|
| 2.35% | 8.9% | 0.58% | 0.32% | 0.38% | 42.1% | 0.62% | 27.25% |

The gold-silver-zinc crust after squeezing out liquid bismuth via a presser is transferred into a vacuum-distillation furnace for zinc removal. Under the conditions of negative pressure of 1.2 kPa, distillation furnace temperature of 700° C. and condenser temperature of 450° C., precious metal-rich lead alloy, and a blue powder and zinc with 98.2% purity are produced. The zinc and blue powder return to the process of adding zinc to remove silver in the lead anode slime treatment.

After blowing the precious metal-rich lead alloy via the top-blown rotary furnace, a gold-silver alloy with sum of gold and silver more than 98% is produced. The electrolysis is conducted by using the gold-silver alloy as the anode, stainless steel sheet as the cathode, the aqueous solution of silver nitrate and nitric acid as the electrolyte, and applying DC to an electrolytic cell. The electrolytic refining produces silver cathode, residual anode and silver anode slime. 99.99% of silver ingots are obtained by the silver cathode casting.

The silver anode slime is subject to preleaching treatment of diluted hydrochloric acid solution to remove most of the impurities. Then hydrochloric acid and chlorine gas are used to leach and dissolve the anode lime, and only the generated silver chloride and some insoluble impurities are deposited. Next, sodium bisulfite is used to precipitate out gold from the filtrate. The precipitated gold sand is filtered, washed and further dried to produce 99.99% of gold sand, 99.99% of gold ingots are thus obtained by casting the gold sand.

The above description with respect to the disclosed examples enables those skilled in the art to realize or use the present invention. It is apparent for those skilled in the art to make various modifications to these embodiments according to the general principles defined herein, without departing from the spirit or scope of the present invention. Therefore, the invention should not be limited to these examples shown herein, but should be suited to widest scope corresponding to the principles and novel characters disclosed by this invention.

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated.

What is claimed is:

1. A process for recovering valuable metals from precious metal smelting slag, comprising the following steps:
    a) Smelting the precious metal smelting slag and a flux in a top-blown rotary furnace to produce lead-bismuth alloy, wherein the precious metal smelting slag comprises Au, Ag, Bi and Pb, and wherein the flux comprises 1 to 7 parts by weight of coke powder, 1 to 7 parts by weight of sodium carbonate, 0 to 7 parts by weight of silica sand, 1 to 6 parts by weight of quicklime, 1 to 5 parts by weight of iron powder and 0 to 20 parts by weight of lead oxide, per 100 parts by weigh of the precious metal smelting slag;
    b) Electrolyzing the lead-bismuth alloy at a current density ranging from 60 to 110 $A/m^2$ to produce lead cathode and lead anode slime;
    c) Refining the lead anode slime to produce bismuth and silver-zinc crust; and
    d) Extracting gold and silver from the silver-zinc crust.

2. The process according to claim 1, wherein the precious metal smelting slag comprises:
    Au ranging from 0.01 to 1 wt %;
    Ag ranging from 0.05 to 4 wt %;
    Bi ranging from 1 to 10 wt %;
    Pb more than 10 wt %;
    Cu ranging from 0 to 1.5 wt %;
    Sb ranging from 0 to 4 wt %; and
    As ranging from 0 to 3 wt %.

3. The process according to claim 1, wherein in step a), the precious metal smelting slag with particle size of between 50 and 100 mesh and the flux are smelted at the temperature of between 850 and 1300° C., to produce lead-bismuth alloy, reducing slag, copper dross, arsenic-antimony dross and smoking dust, and the contents of gold and silver in the reducing slag are controlled to be less than 1 g/t of gold and 100 g/t of silver respectively.

4. The process according to claim 1, wherein in step b), the lead-bismuth alloy is used as an anode, an lead starting sheet is used as a cathode, and a liquid mixture of lead fluorosilicate and fluorosilicic acid is used as electrolyte.

5. The process according to claim 1, wherein in step c), bismuth liquor is produced by subjecting the lead anode slime sequentially to copper removal treatment, arsenic-antimony removal treatment, basic refining, silver removal by zinc addition, and chloridizing refining treatment; and caustic soda and potassium nitrate are added to the bismuth liquor, to produce bismuth and silver-zinc crust after reaction.

6. The process according to claim 1, wherein step d) comprises d1) Subjecting the silver-zinc crust to vacuum distillation treatment, so as to produce precious metal-rich lead alloy and zinc after condensation;

d2) Blowing the precious metal-rich lead alloy in the top-blown rotary furnace, so as to produce gold-silver alloy; and d3) Electrolyzing the gold-silver alloy to produce gold and silver.

7. The process according to claim 6, wherein in step d1), the vacuum distillation is performed at the temperature between 600 and 900° C., and the condensation is performed at the temperature between 350 and 500° C.

8. The process according to claim 6, wherein step d3) comprises:

with the gold-silver alloy as an anode, with a stainless steel sheet as a cathode, with an aqueous solution of silver nitrate and nitric acid as electrolyte, electrolyzing the gold-silver alloy by applying direct current (DC) to an electrolytic cell, so as to produce silver and silver anode slime;

subjecting the silver anode slime sequentially to preleaching treatment of diluted hydrochloric acid, leaching treatment of hydrochloric acid and chlorine gas, so as to produce filtrate; and mixing the filtrate with sodium bisulfite, so as to obtain gold after reaction.

9. The process according to claim 6, further comprising:

the zinc obtained from step d1) is used for the refining treatment of lead anode slime in step c).

10. The process according to claim 1, wherein more than 95% of gold, more than 95% of silver, more than 90% of lead and more than 90% of bismuth are recovered.

* * * * *